Dec. 29, 1959     R. W. BUNTENBACH     2,919,403
FREQUENCY MEASURING AND DISPLAY SYSTEM
Filed June 15, 1954     2 Sheets-Sheet 1

INVENTOR.
RUDOLPH W. BUNTENBACH
BY
ATTORNEY

INVENTOR.
RUDOLPH W. BUNTENBACH
BY
ATTORNEY

United States Patent Office 2,919,403
Patented Dec. 29, 1959

2,919,403

FREQUENCY MEASURING AND DISPLAY SYSTEM

Rudolph W. Buntenbach, San Francisco, Calif., assignor to Vitro Corporation of America, Verona, N.J.

Application June 15, 1954, Serial No. 436,853

9 Claims. (Cl. 324—79)

My invention relates to systems for measuring small frequency differences between two incoming high frequency signals subject to frequency variations and for subsequently providing a visual indication of this difference.

Accordingly, it is an object of the present invention to provide new and improved apparatus for measuring and displaying small frequency differences between two incoming high frequency signals.

It is another object to provide apparatus of the character indicated which derives, from two incoming high frequency signals, two low frequency signals which exhibit the same absolute frequency difference, and then measures and displays the frequency difference between the two low frequency signals.

Yet a further object is to provide apparatus of the character indicated which incorporates a relay actuated frequency comparison circuit and further incorporates a relay actuated frequency sampling and frequency regulating circuit.

Figure 1:
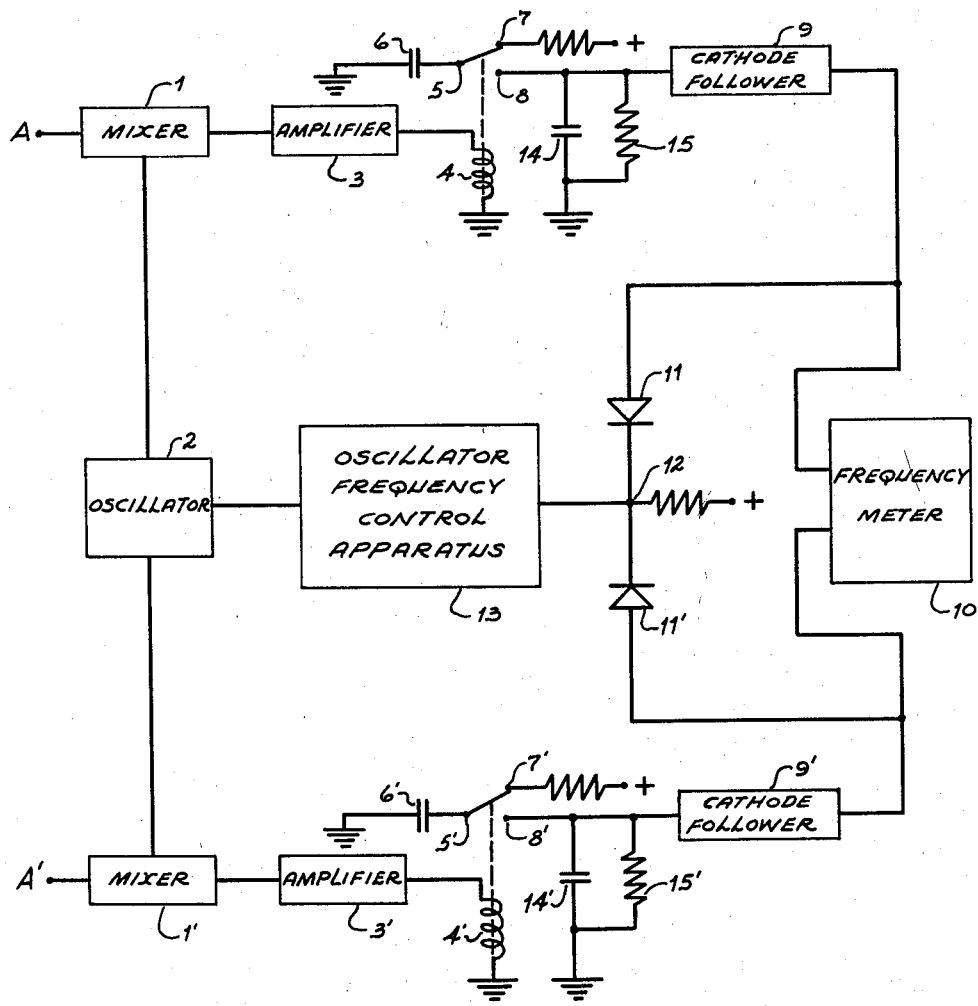
Figure 2:
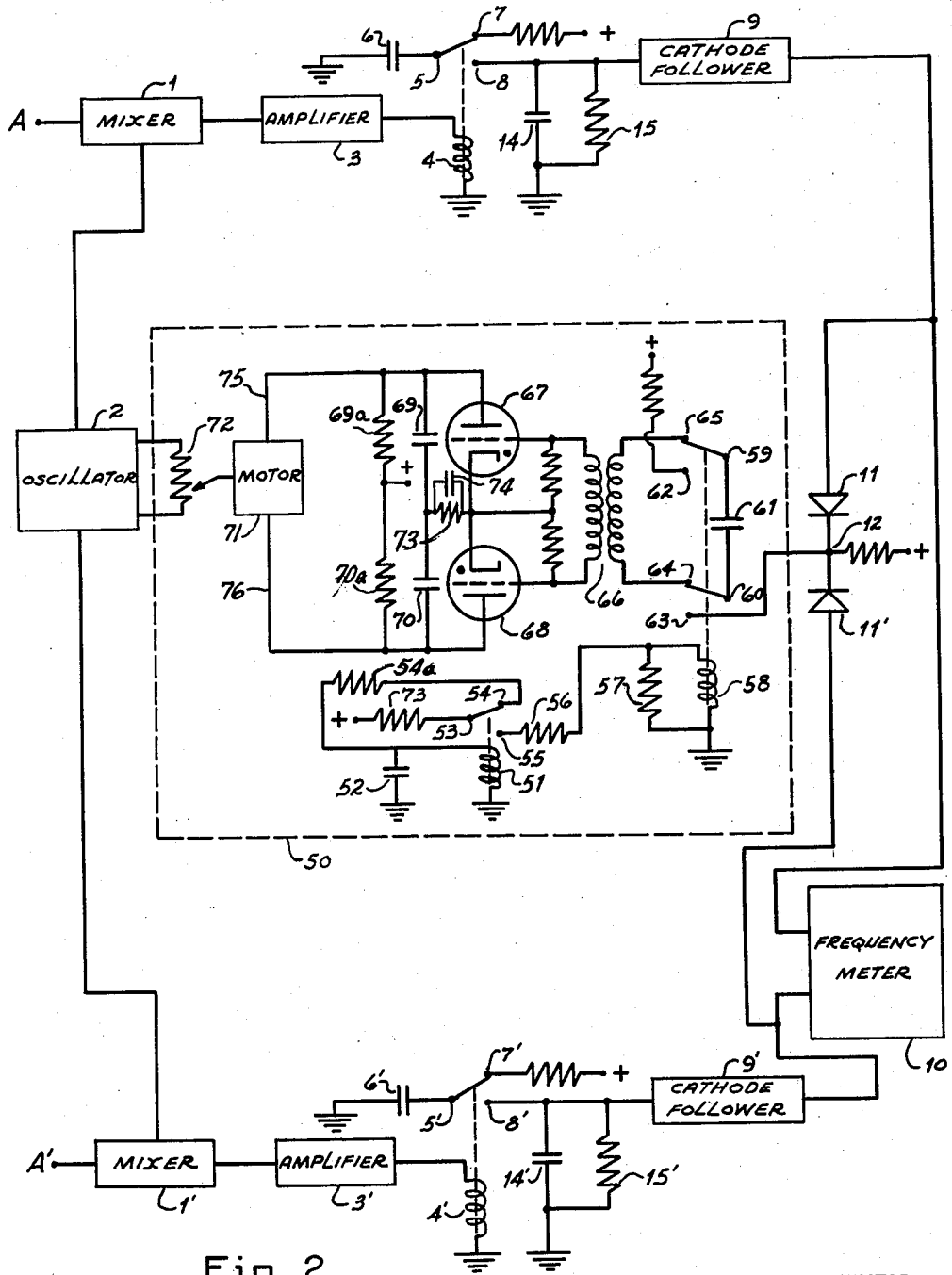

These and other objects will either be explained or will become apparent to those skilled in the art when this specification is studied in conjunction with the accompanying drawings wherein:

Figure 1 is a schematic circuit diagram, partially in block form, illustrating a typical embodiment of the present invention; and Figure 2 is a further schematic circuit diagram illustrating the present invention in somewhat greater detail.

Briefly stated, my invention is directed toward apparatus for measuring frequency differences between first and second incoming high frequency signals. The frequencies of these signals vary continually in both directions about the same nominal frequency. Each signal is separately heterodyned with a voltage of different frequency produced by a common oscillator to produce first and second heterodyned signals which are greatly reduced in absolute frequency but which exhibit the same absolute frequency difference.

Each heterodyned signal is fed to a relay and energizes and deenergizes same at a frequency equal to the heterodyned signal frequency. By means of the relay switching action, a capacitor is charged to a voltage which is proportional to the frequency of the particular heterodyned signal. The voltages on both capacitors are compared, and the voltage difference, which is proportional to the frequency difference between the signals, is supplied to a meter which is calibrated to indicate or display this frequency difference and sense directly. To insure meter calibration accuracy and further maintain proper phase relations between heterodyned signals, it is necessary to maintain the difference frequency between the heterodyned signal having the lower instantaneous frequency and the frequency of the common oscillator at a constant predetermined value. This is accomplished by instantaneously determining which capacitor voltage is the lower and using this lower voltage to control the frequency of the common oscillator.

Referring now to Figure 1, incoming high frequency signal A, which is subject to small frequency variations, is supplied to mixer 1 wherein it is heterodyned with a voltage of different frequency supplied from oscillator 2 to produce a first heterodyned low frequency signal. This first signal, after amplification in amplifier 3, is supplied to the winding of relay 4. The common pole 5 of relay 4 is connected through capacitor 6 to the ground. Pole 7 is connected through a resistor to a point of fixed positive potential. Pole 8 is connected through the parallel combination of capacitor 14 and resistor 15 to ground and is also connected to the input of cathode follower 9. The output of cathode follower 9 is connected to one side of frequency meter 10.

Incoming signal A' is fed through a like combination of circuit elements (differentiated from the elements operating on signal A by like numbers succeeded by a') to the other side of frequency meter 10.

Relays 4 and 4' are energized and de-energized on alternate half cycles at the frequencies of heterodyned signals derived from signals A and A' respectively. As these relays are energized and de-energized, capacitors 6 and 6' are charged on one half cycle and discharge into capacitors 14 and 14' on the next half cycle. Since capacitors 14 and 14' are permanently connected to the inputs of cathode followers 9 and 9' and continuously discharge through resistors 15 and 15' no switching transients are transmitted to the cathode follower. The average voltage on each of capacitors 14 and 14' is proportional to the driving frequency of the corresponding relay. In other words, the R-C combination of the condensers 14 and 14' and the resistors 15 and 15' form smoothing networks for the potentials on the condensers 6 and 6'.

Frequency meter 10 is merely a calibrated voltmeter which indicates the frequency difference in cycles corresponding to the voltage difference between the voltages developed across capacitors 14 and 14'. The polarity of the voltage difference determines the direction in which the meter 10 indicator moves from its central zero position and consequently provides an indication of the frequency sense; i.e., which signal has the higher frequency. In this example, the meter is connected in such a manner that the indicator swings to the side of the meter which receives the higher signal frequency.

In order for meter 10 to measure this frequency difference accurately, it is necessary for one of the capacitor voltages (i.e., capacitors 14 and 14') to be constant and represent a fixed frequency. Thus, the difference between the oscillator frequency and the frequency of one of the incoming signals must be held constant. If the higher frequency signal is used in this manner, the lower frequency signal may be decreased without limit and pass through the zero frequency point. Should this situation occur, the phase of the heterodyned lower frequency signal will be reversed and the meter will not read properly. Hence the difference between the oscillator frequency and the lower frequency signal must be held constant; since signals A and A' are both variable in frequency, at any instant it is necessary to determine which signal is of lower frequency.

To this end, the cathodes of diodes 11 and 11' are coupled to the outputs of cathode followers 9 and 9' respectively. The common junction 12 of the anodes of these diodes are connected through a resistor to a point of positive potential. Through diode action, junction 12 will be clamped to the one cathode follower yielding the lowest output voltage (and consequently the lowest frequency). The diode connected to the other cathode follower will be rendered non-conductive because of this clamping action.

The voltage appearing at junction 12 is supplied to a conventional oscillator frequency control apparatus 13 (such as a reactance tube) to shift the frequency of oscillator 2 in such a direction that the difference between the oscillator frequency and the lowest incoming signal frequency is maintained at a preselected constant value.

Figure 2 shows a modification of Figure 1 wherein like elements are identified by like numbers. The oscillator frequency control apparatus shown in Figure 1 is replaced with the elements shown contained within the dotted outline 50. The winding of relay 51 is shunted by a capacitor 52 and is grounded at one end. The common pole 53 of relay 51 is connected through a resistor 73 to a point of positive fixed potential. Pole 54 is connected through a resistor 54a to the other end of the relay 51 winding. Pole 55 is connected through resistors 56 and 57 to ground. The winding of relay 58 is shunted across resistor 57.

When relay 51 is in the position indicated, relay 58 is de-energized. At this point, current flows through resistor 73, and poles 53 and 54, to both the winding of 51 and capacitor 52. Initially, capacitor 52 acts as a short circuit and no current flows through winding. As capacitor 52 is charged, however, an increasing current flows through this winding; when the current flow builds up to a critical value, relay 51 is energized, and current flows through relay 58 and energizes same. Simultaneously, capacitor 52 discharges through the winding of relay 51; when the current flow produced by this discharge falls to a critical value, relay 51 (which is spring-loaded) is mechanically urged back to its initial position.

The two common poles 59 and 60 of relay 58 are connected to each other through capacitor 61. Pole 62 is connected through a resistor to a point of fixed potential. Pole 63 is connected to the junction 12 of diodes 11 and 11'. Poles 64 and 65 are connected to opposite ends of the primary winding of transformer 66. When relay 58 is energized, capacitor 61 is charged in accordance with the polarity and magnitude of the voltage difference appearing between poles 62 and 63. The circuit values are such that when the frequency of lowest signal A or A' attains the preselected constant value, the voltage across capacitor 61 is zero. At all other periods, this voltage is finite and proportional to the difference between this desired constant value and the actual value.

When relay 58 is de-energized, capacitor 61 discharges through the primary winding of transformer 66. The voltage thus induced in the secondary winding of this transformer is applied between the grids of thyratrons 67 and 68. Depending on the polarity of the voltage on capacitor 61, one or the other of these thyratrons 67 and 68 will fire. Since the capacitors 69 and 70 have been charged from a positive source through resistors 69a and 70a, respectively, and since the juncture of the capacitors 69 and 70 is coupled through a resistor 73 and a bypass capacitor 74 to the cathodes of the thyratrons 67 and 68, such firing will discharge the appropriate one of capacitors 69 and 70. The condensers 69 and 70 are connected to a reversible motor 71 through conductors 75 and 76. It is apparent that the condenser on the side of the thyratron which does not fire will discharge through the motor 71 which will advance a step proportional to the total electrical impulse delivered by the condenser discharge. The motor is direction-sensitive and will rotate in a direction which depends upon the particular thyratron which fires. An arm of potentiometer 72 is coupled to the motor shaft. The setting of this arm determines the frequency of oscillator 2. The direction of motor rotation is chosen so that the oscillator frequency is always maintained in the desired relation to the lowest frequency signal A or A'.

While I have described and pointed out my invention as applied to the above embodiments, further modifications within the scope and sphere of the invention will be apparent to those skilled in the art, and it is my intention not to be limited except as indicated in the claims which follow.

1. In the method of measuring small frequency differences between first and second incoming high frequency signals which are subject to small frequency variations, the steps comprising individually heterodyning said signals with a common alternating control signal to produce first and second heterodyned signals whose respective frequencies represent the difference between the frequency of the control signal and the respective frequencies of the first and second incoming signals; obtaining first and second potentials representative of said first and second heterodyned signals; comparing said potentials to determine which heterodyned signal has the lower instantaneous frequency; and varying the frequency of said control signal in accordance with said comparison to maintain a predetermined frequency difference between the control signal and the incoming signal corresponding to said lower frequency heterodyned signal.

2. In the method of claim 1, the further step of comparing said first and second potentials to measure the frequency difference between the first and second heterodyned signals.

3. In apparatus responsive to first and second incoming high frequency signals each of which is subject to small frequency variations, an oscillator for generating an alternating control signal; first heterodyning means responsive to said first incoming signal and said control signal to derive therefrom a first heterodyned signal representing the frequency difference therebetween; second heterodyning means responsive to said second incoming signal and said control signal to derive therefrom a second heterodyned signal representing the frequency difference therebetween; means coupled to both heterodyning means and responsive to said first and second heterodyned signals to provide first and second potentials representative of said first and second heterodyned signals, means to compare said potentials to determine the heterodyned signal having the lower instantaneous frequency; and means to supply the potential representative of said lower frequency heterodyned signal to said oscillator to vary the frequency thereof so that the difference between the oscillator frequency and the frequency of the incoming signal corresponding to said lower frequency heterodyned signal is held at a predetermined value.

4. Apparatus as set forth in claim 3 further including a frequency meter coupled to said first and second heterodyning means and differentially responsive to the frequencies of said first and second heterodyned signals.

5. In apparatus responsive to first and second incoming high frequency signals each of which is subject to small frequency variations, an oscillator for generating an alternating control signal, said oscillator being provided with an adjustable potentiometer control whose setting determines the oscillator frequency; first heterodyning means responsive to said first incoming signal and said control signal to derive therefrom a first heterodyned signal representing the frequency difference therebetween; second heterodyning means responsive to said second incoming signal and said control signal to derive therefrom a second heterodyned signal representing the frequency difference therebetween; means coupled to both heterodyning means and responsive to said first and second heterodyned signals to provide first and second potentials representative of said first and second heterodyned signals, means to compare said potentials to determine the heterodyned signal having the lower instantaneous frequency; and a servomechanism responsive to potential representative of said lower frequency heterodyned signal to adjust said potentiometer control in accordance with this frequency so that the difference between the oscillator frequency and the frequency of the incoming signal corresponding to said lower frequency heterodyned signal is held at a predetermined value.

6. Apparatus as set forth in claim 5 wherein said means coupled to both heterodyning means includes first sampling means periodically responsive to said first heterodyned signal to produce a first sampled signal, second sampling means periodically responsive to said second heterodyned signal to produce a second sampled signal, and said comparing means includes a clamping circuit coupled between both of said sampling means and the input of said servomechanism to clamp the sampling means yielding the lower potential signal to the input of said servomechanism.

7. Apparatus as set forth in claim 6 further including third sampling means periodically responsive to the lower potential signal and interposed between the output of the clamping circuit and the input to the servomechanism.

8. Apparatus for measuring the frequency difference between first and second incoming signals, said apparatus comprising a frequency meter provided with first and second input circuits each including smoothing networks; first and second signal channels, each channel including a relay having a winding and first, second and third poles, said third pole being designated as a common pole, said first pole being coupled to a first point of operating potential, said second pole being coupled to the corresponding input circuit of said meter, and further including a capacitor coupled between the common pole and a second point of operating potential; and means to apply said first and second signals to said first and second channels respectively to energize and de-energize each relay on alternating half cycles at the frequency of the signal applied to the corresponding channel and charge the corresponding capacitor to a voltage proportional to said frequency whereby said meter is actuated by the voltage differential between said capacitors.

9. In apparatus responsive to first and second incoming high frequency signals each of which is subject to small frequency variations, an oscillator for generating an alternating control signal; a first heterodyning stage responsive to said first incoming signal and said control signal to derive therefrom a first heterodyned signal representing the frequency difference therebetween; a second heterodyning stage responsive to said second incoming signal and said control signal to derive therefrom a second heterodyned signal representing the frequency difference therebetween; first means responsive to said first heterodyned signal to derive therefrom a first potential whose magnitude is proportional to said first heterodyned signal; second means responsive to said second heterodyned signal to derive therefrom a second potential whose magnitude is proportional to said second heterodyned signal; a clamping circuit coupled to both said first and second means and only yielding in its output the smaller one of said first and second potentials; and means to supply said smallest potential to said oscillator to adjust the frequency thereof so that a constant difference is maintained between the oscillator frequency and the frequency of the incoming signal corresponding to said smaller potential.

References Cited in the file of this patent

UNITED STATES PATENTS

| | | |
|---|---|---|
| 1,607,471 | Martin | Nov. 16, 1926 |
| 2,205,655 | Kelly | June 25, 1940 |
| 2,208,125 | Feingold | July 16, 1940 |
| 2,532,435 | Allen | Dec. 5, 1950 |
| 2,537,104 | Taylor | Jan. 9, 1951 |
| 2,558,100 | Rambo | June 26, 1951 |
| 2,566,222 | Lynch | Aug. 28, 1951 |
| 2,576,900 | Brockman | Nov. 27, 1951 |
| 2,607,528 | McWhirter | Aug. 19, 1952 |
| 2,666,899 | Smullin | Jan. 19, 1954 |
| 2,778,972 | Ellis | Jan. 22, 1957 |

FOREIGN PATENTS

| | | |
|---|---|---|
| 706,298 | Great Britain | Mar. 24, 1954 |